United States Patent [19]
Smolin et al.

[11] 3,880,992
[45] Apr. 29, 1975

[54] MIXTURE USEFUL ON A SUNSCREEN COMPOSITION

[75] Inventors: Martin Smolin, Edison; Norman Milstein, Iselin, both of N.J.; Irving A. Kaye, Brooklyn, N.Y.; Kalmen Motiuk, Edison, N.J.

[73] Assignee: CPC International Inc., Englewood Cliffs, N.J.

[22] Filed: Dec. 19, 1973

[21] Appl. No.: 426,413

[52] U.S. Cl.............................. 424/60; 260/471 R
[51] Int. Cl......................................... C07c 101/62

[58] Field of Search.................... 260/471 R; 424/60

[56] References Cited
FOREIGN PATENTS OR APPLICATIONS
1,564,525    6/1970    France........................... 260/471 A Primary Examiner—Lorraine A. Weinberger
Assistant Examiner—L. A. Thaxton
Attorney, Agent, or Firm—Salvatore C. Mitri

[57] ABSTRACT

A sunscreen composition comprising an N-hydroxyalkyl-substituted ethyl p-amino-benzoate.

7 Claims, No Drawings

MIXTURE USEFUL ON A SUNSCREEN COMPOSITION

The invention of this application has to do with a sunscreen composition and a method by which such sunscreen composition may be prepared. It deals more particularly with sunscreen compositions which are prepared by the reaction of esters of p-amino benzoic acid with alkylene oxides.

BACKGROUND OF THE INVENTION

The sun's rays are not, of course, uniformly effective on human skin; certain of them cause sunburn, i.e., a burning and blistering of the skin, whereas others cause tanning of the skin. The latter is desirable for cosmetic reasons whereas the former is very undesirable. Radiation in the region below 280 nm is either absorbed by the atmosphere or scattered before reaching the earth's surface. A sunscreen material should filter out most of those ultra-violet rays which cause sunburn, i.e., those in the region of 290–320 nm; also, so as to permit tanning, it should allow passage of that portion of the sunlight in the area of 320–400nm. The narrow range of 308–310 nm is the area where the greatest sunburning intensity is found in sunlight. Actually, radiation at 296.7 nm produces the maximum erythemal response, but since very little light of this wave length is present in sunlight which reaches the earth, it is of little importance in the formulation of sunscreen compositions.

The 5-hour period between 10:00 A.M. and 3:00 P.M. is the period of highest density of erythemal and tanning irradiation with the peak density occurring at noon.

Other desirable qualities of a sunscreen material are that it should have a life of at least 2 hours, and preferably 4 hours or more; it should be readily soluble in a wide variety of solvents; and it should be non-toxic as well as non-irritating. It should also not be darkened by exposure to sunlight; nor should it stain clothing. It should be resistant to washing.

p-Amino benzoic acid is an effective sunscreen material. It provides good protection from solar irradiation, it is not washed away by sweating or swimming or the like and its residual effectiveness is good. Unfortunately, it has a strong tendency to stain clothing when it is wet and has been exposed to sunlight. A brownish-black discoloration is produced and, while it can be removed by laundering, though not easily, this remains as a decided disadvantage. Furthermore, its maximum ultraviolet absorption is at about 289 nm.

According to U.S. Pat. No. 2,561,468 (Guest), the reaction of para-amino benzoic acid with ethylene oxide or propylene oxide results in esterification of the carboxy group as well as substitution of hydroxyalkyl groups for each of the hydrogens on the nitrogen atom, to produce a material which is effective to prevent the absorption by human skin of the harmful blistering rays of sunlight. The reaction is carried out in the presence of a substantial amount of water, and the product is said to be soluble in water. Although this is set out in the patent as an advantage of the product, as a matter of fact it would seem to be a disadvantage because water-solubility permits the sunscreen material to be washed away on sweating, swimming or showering. In addition, it is difficult to avoid reaction of the alkylene oxide with water to form glycols. Attempts to duplicate Guest's work invariably result in the formation of a dark product having an alkylene oxide odor.

In French Pat. No. 1,564,525, ethyl p-amino benzoate (benzocaine) is reacted with ethylene oxide in the presence of sodium hydroxide as a catalyst. Very large amounts of ethylene oxide are used, e.g., 20–30 moles, per mole of ethyl para-amino benzoate. The product is said to absorb 90% of the sun's rays having a wave length between 297 and 312 nm.

Alkylene oxides will react with the hydrogen atoms in an aromatic amine to form a mono-hydroxyalkyl or dihydroxyalkyl amine. Additional alkylene oxide will react with these products under certain conditions to form a polyoxyethylene-substituted amine, and this secondary reaction seems to be promoted by alkaline and acidic catalysts. The use of an alkaline catalyst invariably results in a product having some undesirable color, unless, as in the above French patent, a very large amount of alkylene oxide is reacted so as to provide enough oxyalkylene groups to "dilute" the undesirable color. Some ethanol is also split out from the benzocaine. Either type of catalyst, i.e., alkaline or acid, causes the formation of a product which is less soluble in oil solvents than similar products made without a catalyst.

It is accordingly a principal object of the present invention to provide an improved sunscreen composition.

Another object of the present invention is to provide a sunscreen composition which is characterized by desirable color and solubility.

SUMMARY OF THE INVENTION

These and other objects are attained by the process for the preparation of a sunscreeen composition comprising reacting an alkyl ester of p-amino benzoic acid wherein the alkyl group has 1–4 carbon atoms, with 1.5–2.0 moles of propylene oxide or ethylene oxide in the absence of any substantial amount of catalyst, and isolating an N-hydroxyalkyl p-amino benzoate.

Preferably, the ester is an ethyl ester. The ethyl ester of p-amino benzoic acid is known as benzocaine and is readily available. The reaction is carried out simply by mixing the reactants at a temperature ranging from about 100°C to about 180°C. In the case of products prepared from propylene oxide the temperature ordinarily is 150°–160°C. Inasmuch as ethylene oxide and propylene oxide both have boiling points below these temperatures, it is necessary to carry out the reaction at elevated pressures. A solvent may be used, but is not necessary and in fact it usually is undesirable to employ a solvent. Suitable solvents should, of course, be inert, i.e., unreactive both with the p-amino benzoic ester and the alkylene oxide under the conditions of the reaction. Cyclohexane, heptane, benzene, toluene and tetrahydrofuran are suitable solvents.

The use of a solvent permits better mixing of the reactants; on the other hand, at the conclusion of the reaction the solvent must be removed and its use does add to the cost. Overall, as indicated, the advantages of the use of a solvent are slightly outweighed by the disadvantages.

Generally, the reaction is carried out by heating the p-amino benzoic ester to the desired reaction temperature, in a closed system, then introducing the alkylene oxide portionwise, as it is consumed by the reaction. The amount of alkylene oxide used in the reaction ranges from about 1.5 to about 2.0 moles per mole of p-amino benzoic ester. The addition and reaction of this amount of alkylene oxide ordinarily is accomplished within a period of from about 2 to about 15 hours.

The use of this proportion of alkylene oxide results in the formation of a product which comprises both N-mono-hydroxyalkyl and N,N-dihydroxyalkyl-substituted p-amino benzoic esters. Very few polyoxyalkylene chains are formed. On the other hand, despite the use in some instances of as much as 2 moles of alkylene oxide, there always is at least some N-monohydroxyalkyl-substituted product, such that the ratio of the di-substituted product to the mono-substituted product is from about 1:1 to about 5:1, on a weight basis. That is, the molecular structure of the product is represented by the formula

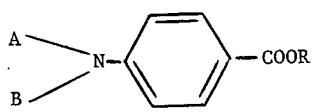

where A is a hydroxyalkyl group having less than 4 carbon atoms, B is hydrogen or hydroxyalkyl having less than 4 carbon atoms, the ratio of hydroxyalkyl to hydrogen in B is from about 1:1 to about 5:1, and R is an alkyl group having 1–4 carbon atoms. Such a product is characterized by good color, odor and stability, and also by the fact that it does not discolor clothing nor is it anesthetic; it is characterized also, of course, by its excellent protection of human skin from sunburning. It is insoluble in water, but soluble in alcohol and hydroalcoholic systems, propylene glycol, isopropyl myristate, corn oil, castor oil and the like.

The preparation of the sunscreen compositions herein is illustrated by the following examples which, however, are not to be taken as limiting in any respect. All parts and percentages are by weight unless otherwise expressly stated.

EXAMPLE 1

To 165 parts of ethyl para-amino benzoate at 150°C, in a stirred autoclave, there is added portion-wise throughout a period of 8 hours 116 parts of propylene oxide. The temperature is maintained at 150°–160°C throughout this period and, after an additional hour of stirring at the same temperature, the reaction is halted and the product mixture analyzed and found to have a saponification number of 198.8 and a hydroxyl number of 395. The pressure within the autoclave varies between 50 psig and 70 psig throughout the reaction. The ultra-violet absorption curve of the product mixture shows a maximum at 308–9 mu. The ratio of N,N-di-substituted product to N-mono-substituted product is 2.4.

EXAMPLE 2

To 330 parts of ethyl para-amino benzoate heated in a stirred autoclave at 150°C there is added portionwise throughout a period of 10 hours 232 parts of propylene oxide. The temperature is maintained at 150°–160°C throughout this period and the pressure varies from 40–60 psig. Stirring is continued for an additional 1 hour whereupon the reaction is concluded and the product mixture analyzed and found to have a saponification number of 209 and a hydroxyl number of 390.3. Its ultra-violet absorption curve shows a maximum at 308–310 mu. The ratio of N,N-di-substituted product to N-mono-substituted product is 3.1.

EXAMPLE 3

To 330 parts of ethyl para-amino benzoate heated in a stirred autoclave at 150°C there is added throughout a period of 15 hours 176 parts of ethylene oxide. The temperature is maintained at 150°–160°C throughout this period and the pressure varies from 40–60 psig. Stirring is continued for an additional 30 minutes whereupon the reaction is concluded and the product mixture analyzed and found to have a saponification number of 202 and a hydroxyl number of 424. Its ultra-violet absorption curve shows a maximum at 312nm. The ratio of N,N-di-substituted product to N-mono-substituted product is 2.3.

EXAMPLE 4

To 302 parts of methyl para-amino benzoate heated in a stirred autoclave at 130°C there is added throughout a period of 1 hour 176 parts of ethylene oxide. The temperature is maintained at about 140°C throughout this period and the pressure varies from 40–60 psig. Stirring is continued for an additional 30 minutes whereupon the reaction is concluded and the ultra-violet absorption curve of the product shows a maximum at 311 nm. The ratio of N,N-di-substituted product to N-mono-substituted product is 3.2.

For actual use as sunscreen compositions, it is necessary to formulate the products of the above examples with auxiliary ingredients which facilitate application to human skin. Illustrative examples of such formulations are as follows:

| Example 5 — (Ointment) | (Parts) |
|---|---|
| Product of Example 1 | 2 |
| Carbowax 4000* | 40 |
| Carbowax 400** | 58 |
| Perfume & Preservative | qs.*** |

*Polyoxyethylene having an average molecular weight of 4000.
**Polyoxyethylene having an average molecular weight of 400.
***"quantum sufficient", i.e., enough to serve the purpose indicated.

| Example 6 — (Jelly) | (Parts) |
|---|---|
| Product of Example 1 | 2.0 |
| Carbopol 940* | 0.8 |
| Water | 46.0 |
| Diisopropanolamine | 1.2 |
| Ethanol (95%) | 50.0 |
| Perfume & Preservative | qs |

*A carboxy vinyl polymer.

| Example 7 — (Cream) | (Parts) |
|---|---|
| Product of Example 2 | 2.0 |
| Petrolatum | 7.5 |
| Isopropyl lanolate | 2.0 |
| Stearic acid | 15.0 |
| Glycerin | 4.0 |
| Water | 68.0 |
| Triethanolamine | 1.5 |
| Perfume & Preservative | qs |

| Example 8 — (Stick) | (Parts) |
|---|---|
| Product of Example 3 | 2.0 |
| Sodium Stearate | 7.0 |
| Sorbitol (70% aqueous solution) | 5.0 |

—Continued

| | |
|---|---|
| Water | 41.0 |
| Ethanol | 45.0 |
| Perfume & Preservative | qs |

| Example 9 — (Lotion) | (Parts) |
|---|---|
| Product of Example 1 | 2.0 |
| Isopropyl palmitate | 7.5 |
| Acetylated lanolin | 1.0 |
| Stearic acid | 2.5 |
| Mineral Oil | 4.5 |
| Glyceryl monostearate | 2.0 |
| Water | 74.7 |
| Propylene glycol | 4.5 |
| Triethanolamine (10% aqueous solution) | 1.0 |
| Carbopol 941 | 0.3 |
| Perfume & Preservative | qs |

| Example 10 — (Lotion) | (Parts) |
|---|---|
| Product of Example 1 | 5.0 |
| Mineral oil extract of lanolin alcohols | 3.0 |
| Isopropyl lanolate | 1.0 |
| Polyoxyl 40 stearate | 2.0 |
| Propylene glycol monostearate | 3.0 |
| Carbopol 934 | 0.5 |
| Triethanolamine (10% aqueous solution) | 5.0 |
| Water | 60.5 |
| EtOH | 20.0 |
| Perfume & Preservative | qs |

| Example 11 — (Liquid Cream) | (Parts) |
|---|---|
| Product of Example 1 | 2.0 |
| Propoxylated (20 moles) lanolin alcohols | 10.0 |
| Propoxylated (2 moles) lanolin alcohols | 5.0 |
| Isopropyl palmitate | 10.0 |
| Carbopol 934 | 0.8 |
| Water | 66.2 |
| 10% aqueous Sodium hydroxide | 2.2 |
| Ethomeen C-25 (10% aqueous ethoxylated cocoamine) | 3.8 |
| Perfume & Preservative | qs |

| Example 12 — (Oil) | (Parts) |
|---|---|
| Product of Example 1 | 2.5 |
| Ethanol, anhydrous | 12.5 |
| Propoxylated (20 moles) lanolin alcohols | 25.0 |
| Isopropyl palmitate | 60.0 |
| Perfume & Preservative | qs |

| Example 13 — (Hydroalcoholic Liquid) | (Parts) |
|---|---|
| Product of Example 1 | 2.0 |
| Ethoxylated (24 moles) cholesterol | 1.0 |
| Ethanol, anhydrous | 60.0 |
| Water | 37.0 |
| Perfume & Preservative | qs |

| Example 14 — (Transparent Lotion) | (Parts) |
|---|---|
| Product of Example 1 | 2.0 |
| Ethanol, anhydrous | 49.0 |
| Propylene glycol | 19.6 |
| Water | 29.4 |
| Perfume & Preservative | qs |

| Example 15 — (Protective Lipstick) | (Parts) |
|---|---|
| Product of Example 1 | 1.0 |
| Beeswax | 6.8 |
| Candella wax | 7.3 |
| Carnauba wax | 3.1 |
| Ozokerite | 5.7 |
| Castor oil | 37.5 |
| Myristyl lactate | 10.4 |
| Hydroxylated lanolin | 5.2 |
| Isopropyl palmitate | 19.8 |
| Pigments | 3.2 |
| Perfume & Preservative | qs |

Application of the above formulations to human skin affords protection from sunburn to the extent that it prevents reddening at as high as 40 MED's of mid-day, summer, temperate zone sunlight. An MED (minimal erythema dose) is equivalent to about 20 minutes' exposure to bright sunlight between 10:00 A.M. and 3:00 P.M., for an untanned, light-skinned person. Furthermore, they do not discolor clothing, nor do they irritate the skin in any way. Suitable sunscreen formulations contain from about 0.5 to about 10.0% by weight of the compositions herein.

What is claimed is:

1. A process for the preparation of a sunscreen composition comprising reacting an alkyl ester of p-amino benzoic acid wherein the alkyl group has 1–4 carbon atoms, with 1.5–2.0 moles of propylene oxide or ethylene oxide in the absence of a catalyst at a temperature of about 100°–180°C, and isolating an N-hydroxyalkyl p-amino benzoate.

2. The process of claim 1 wherein the alkyl group is ethyl.

3. A sunscreen composition comprising a mixture of N-mono-hydroxyalkyl-and N,N-dihydroxyalkyl-substituted p-amino benzoic esters having the structure

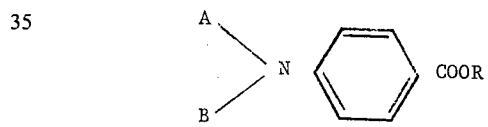

where A is an hydroxyalkyl group having less than 4 carbon atoms, B is hydrogen or an hydroxyalkyl group having less than 4 carbon atoms, the ratio of said hydroxyalkyl to said hydrogen when said hydroxyalkyl and said hydrogen are both present therein being in a ratio of about 1:1–5:1 on a weight basis, and R is an alkyl group having 1–4 carbon atoms, said sunscreen composition being insoluble in water.

4. A sunscreen composition of claim 3 wherein R is ethyl, A is hydroxypropyl or hydroxyethyl and B is hydroxypropyl, hydroxyethyl, hydrogen or a mixture thereof.

5. The sunscreen composition of claim 4 wherein A is hydroxypropyl and B is hydroxypropyl or hydrogen.

6. The sunscreen composition of claim 4 wherein A is hydroxypropyl and B is a mixture of hydroxypropyl and hydrogen.

7. The sunscreen composition of claim 3 wherein said composition has a saponification number of about 198–210, an hydroxyl number of about 390–425 and a maximum ultraviolet absorption of about 308–312 nm.

* * * * *